UNITED STATES PATENT OFFICE.

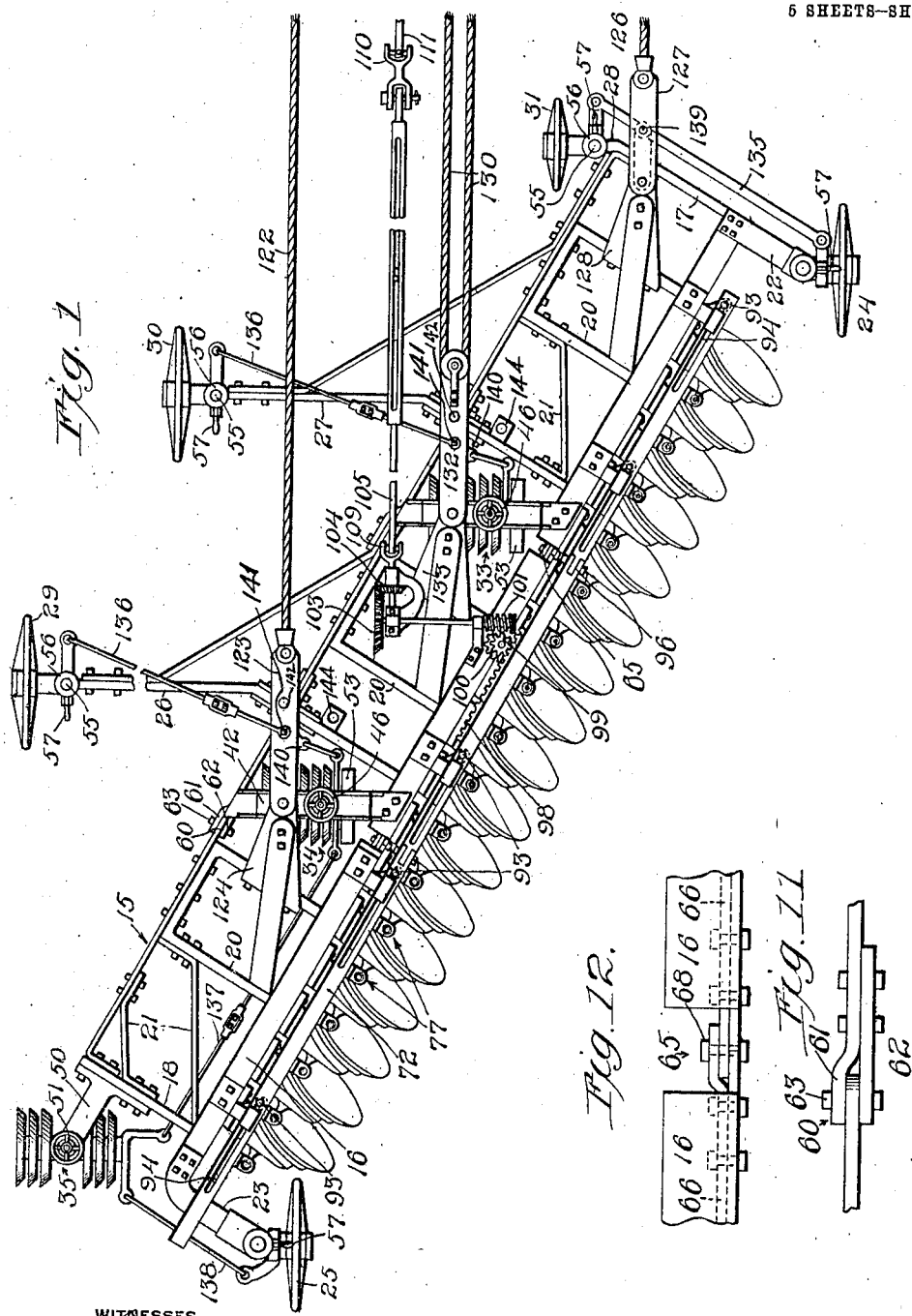

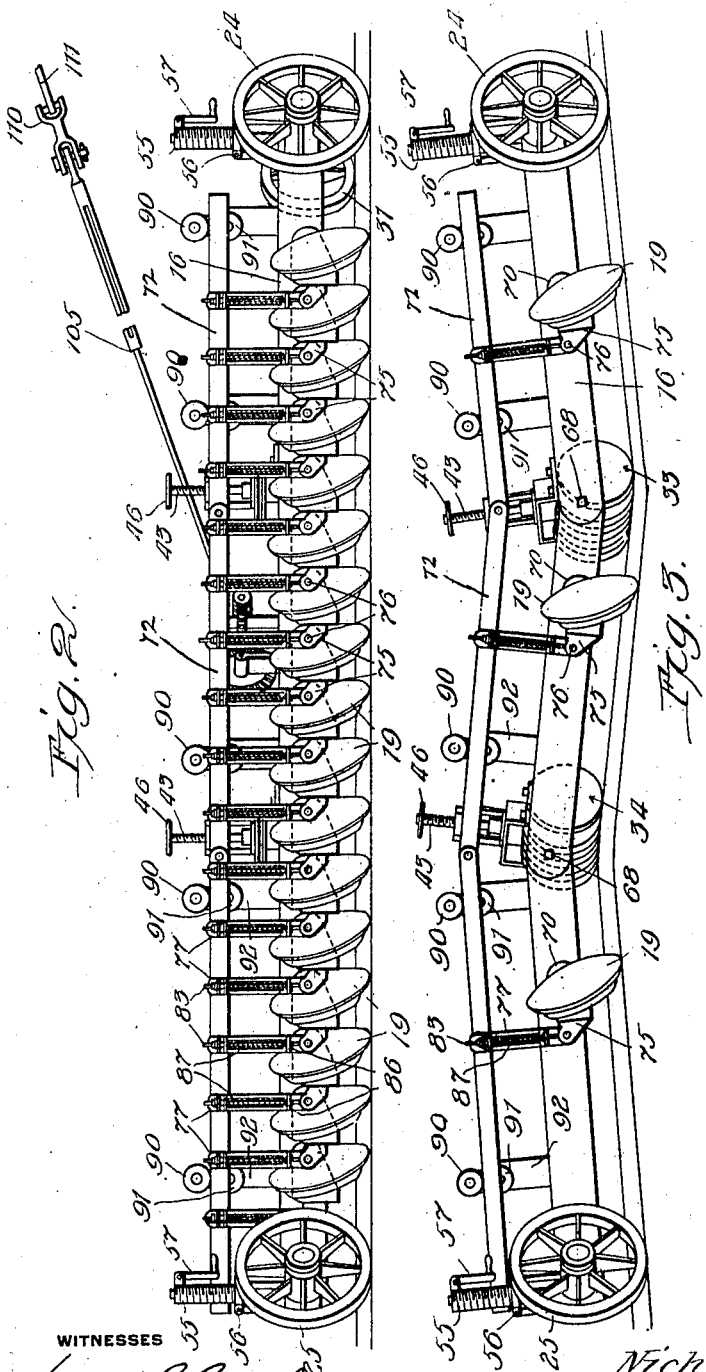

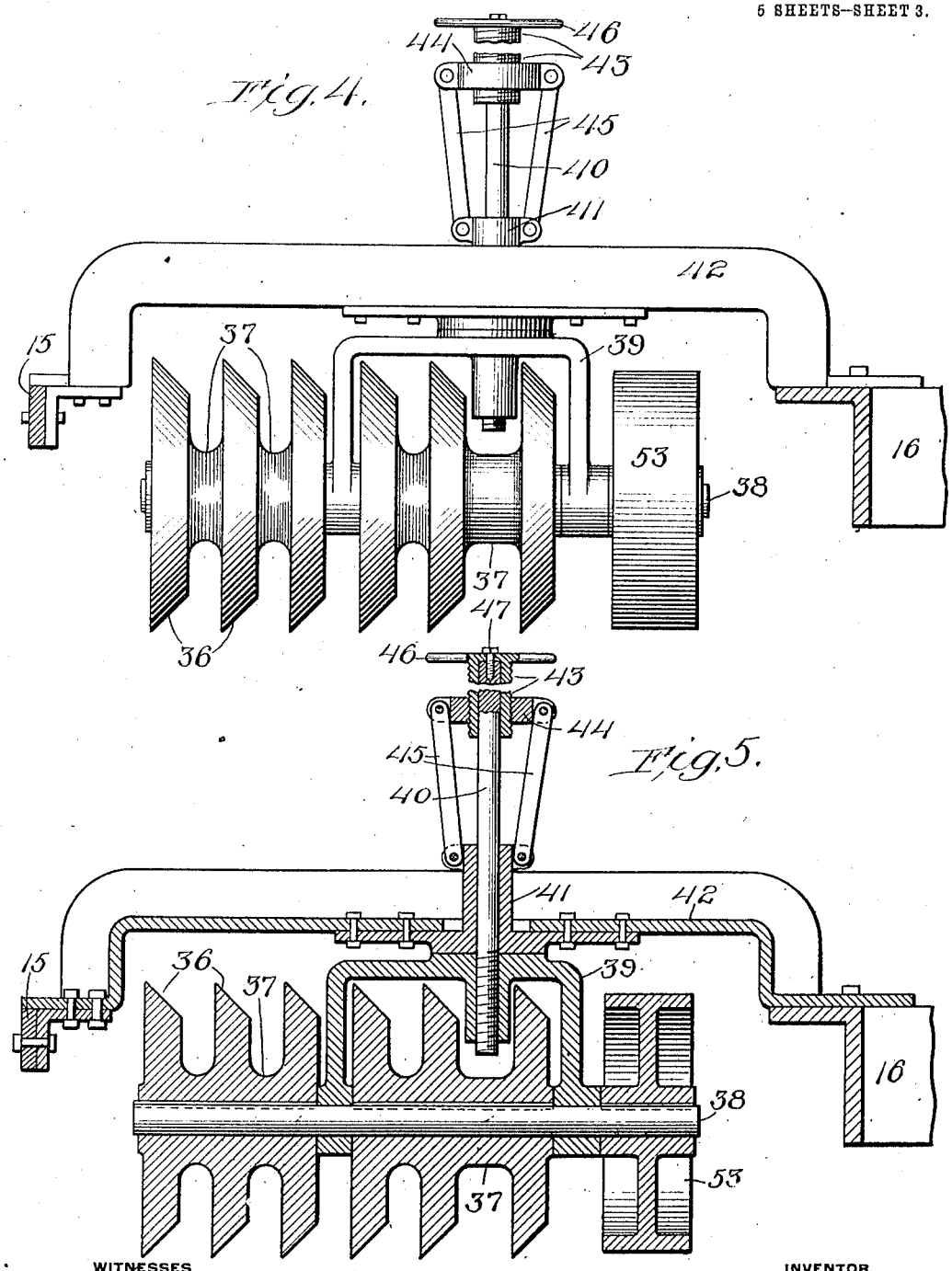

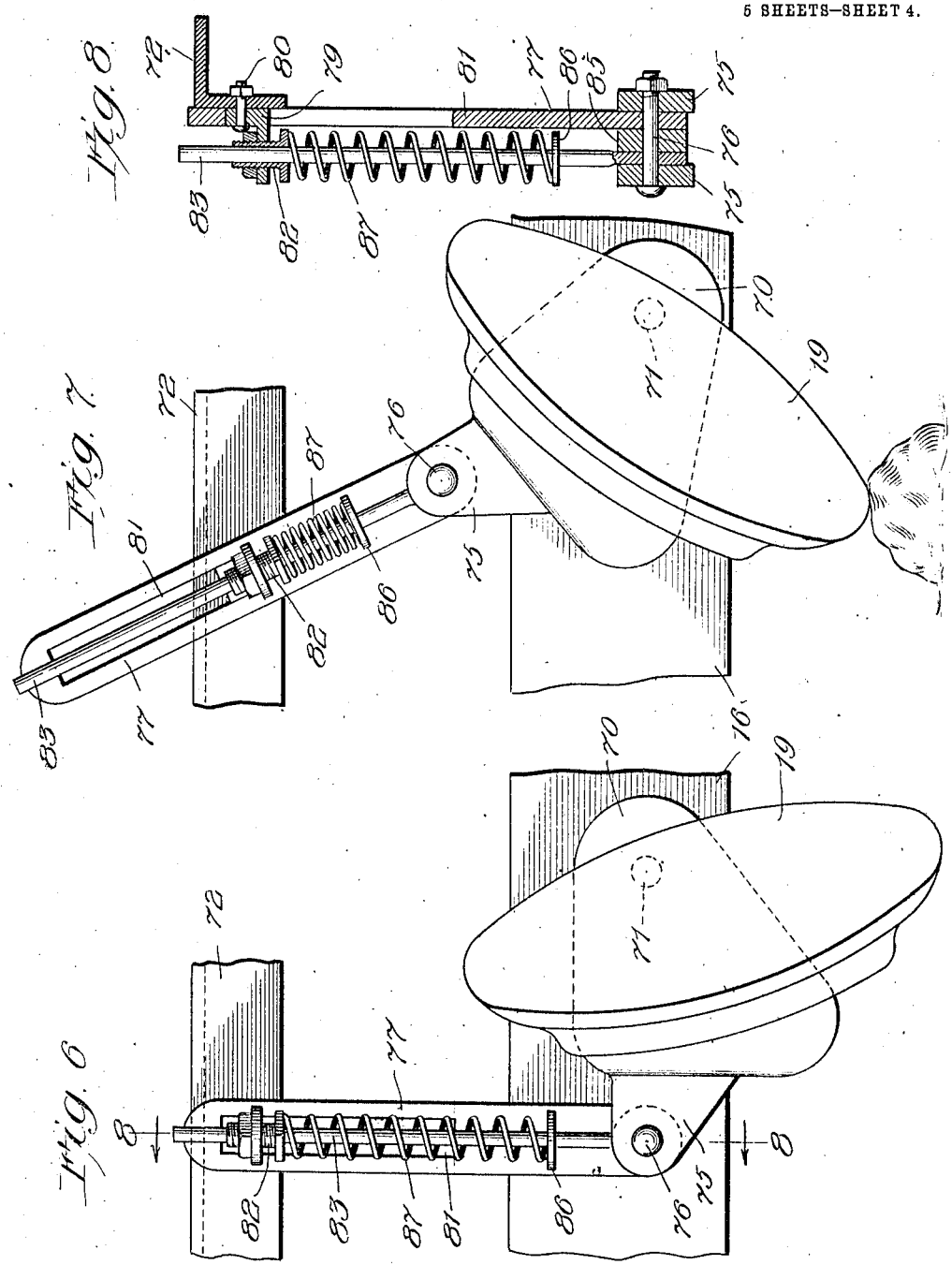

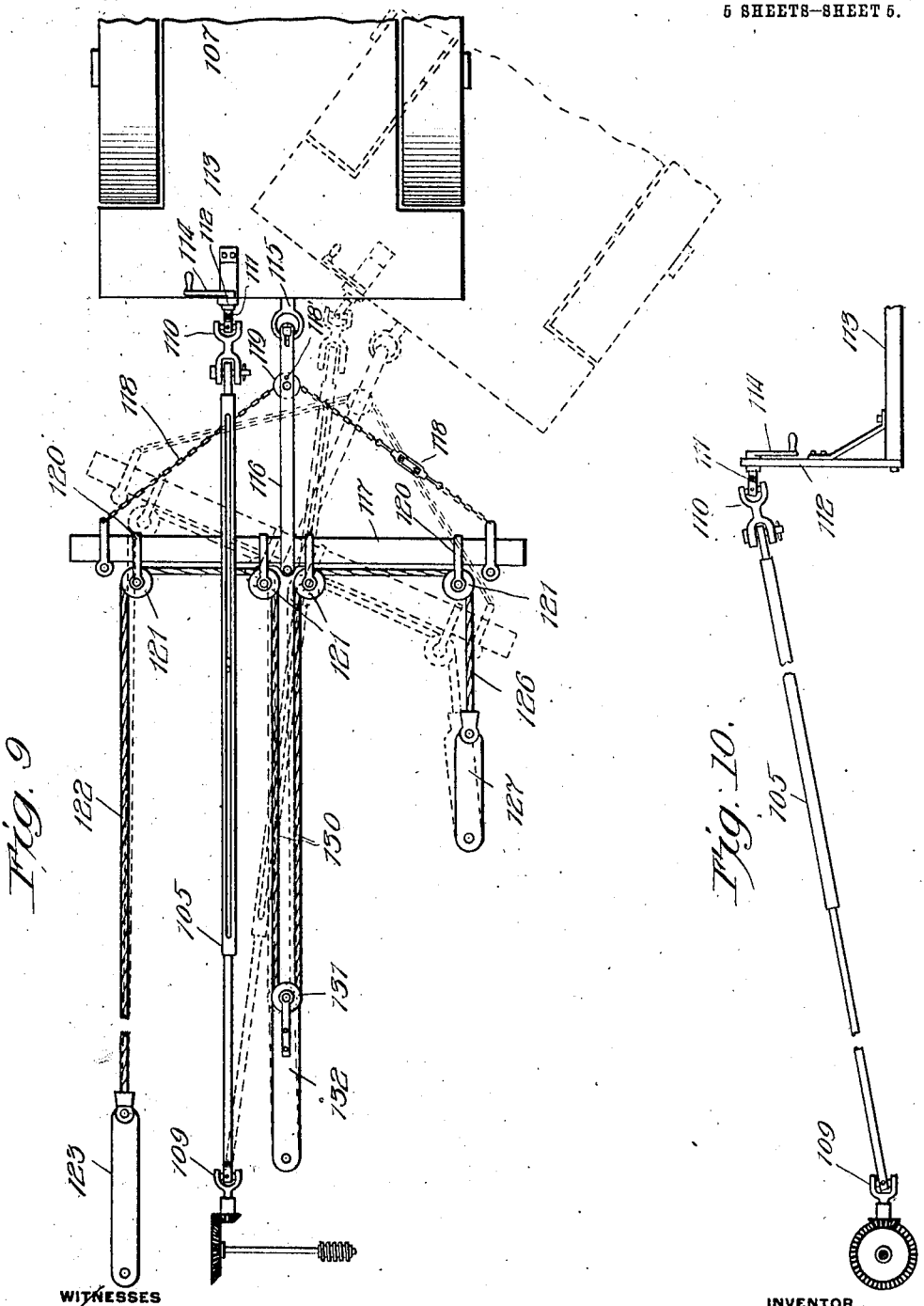

NICHOLAS WEILER, OF FORT COLLINS, COLORADO, ASSIGNOR OF ONE-HALF TO B. L. SHRADER, OF PLAINVIEW, TEXAS.

WHEELED GANG-PLOW.

1,035,126.  Specification of Letters Patent.  Patented Aug. 6, 1912.

Application filed February 8, 1911. Serial No. 607,312.

*To all whom it may concern:*

Be it known that I, NICHOLAS WEILER, a citizen of the United States, and a resident of Fort Collins, in the county of Larimer and State of Colorado, have invented certain new and useful Improvements in Wheeled Gang-Plows; and I do hereby declare that the following is a full, clear, and exact description thereof, reference being had to the accompanying drawings, and to the characters of reference marked thereon, which form a part of this specification.

This invention relates to improvements in motor drawn wheeled gang plows of the disk type and the invention consists in the matters hereinafter set forth and more particularly pointed out in the appended claims.

Among the objects of the invention is to provide an improved single or continuous frame for such plows, the members of which are jointed or hinged together to permit the frame to flex vertically so as to adapt the plow to uneven ground, the plow having a continuous row or series of plow disks mounted thereon and extending from end to end of the frame.

A further object of the invention is to provide a mechanism for raising and lowering all of the plow disks from and to the ground, so arranged that the actuating member of such mechanism carried by the frame may flex to adapt it to the frame.

A further object of the invention is to provide an improved means for connecting the plow disks with the frame, arranged to permit the disks to yield away from the ground when an obstruction, such as a stone, is struck thereby, and thus avoid undue stress being brought upon the disks and their mountings.

A further object of the invention is to provide a novel manual operable means for operating the plow raising and lowering devices from the platform of the engine.

Another object of the invention is to provide an improved guiding means for holding the plow laterally in place and for preventing its shifting out of the line of draft, due to the tendency of the disks, when in action in the ground, to thrust the plow laterally.

Another object of the invention is to provide a connection between the rolling supporting elements of the plow frame together with means for mounting the supporting elements in such a way that when the usual draft connections, by which the plow when in action in the field is drawn forwardly, are released and the plows are elevated from the ground to travel on the road, and the engine attached to one end of the plow frame, the several supporting wheels or elements will track in lines parallel with the longitudinal axis of the plow frame so that the plow frame may be drawn forwardly when moved from place to place in a path parallel to such longitudinal axis.

Other objects of the invention will appear from the foregoing description.

In the drawings,—Figure 1 is a plan view of a plow embodying my invention. Fig. 2 is a side elevation thereof. Fig. 3 is a side elevation of the plow frame and the supporting elements, showing the manner in which the flexible frame adapts itself to uneven ground. Fig. 4 is a detail cross section of the frame, showing a rolling supporting device which is constructed to prevent lateral shifting of the plow when the plow disks are in action. Fig. 5 is a similar view taken in the axial plane of said rolling supporting device. Fig. 6 is a detail illustrating the manner of mounting the plow disks on the frame, showing a spring connection between the disk mounting and its actuating bar to permit the disk to yield out of the ground when it encounters a stone or like obstruction. Fig. 7 is a similar view showing the manner in which the plow disks yield on striking an obstruction. Fig. 8 is a detail section on the line 8—8 of Fig. 6. Fig. 9 is a plan view illustrating the draft connections between the plow and engine and also the mechanism for operating the plow raising and lowering devices. Fig. 10 is a detail illustrating in side elevation the part of the plow raising and lowering mechanism which extends to the engine. Figs. 11 and 12 are details of the hinge connections between the plow frame members.

The frame of the plow comprises two side members 15 and 16 and end members 17 and 18 arranged in the form of a parallelogram. The side member 15 may consist of a bar arranged vertically edgewise, and the other member 16 may have the form of an angle bar, it being made of suitable dimensions to give the required strength thereto.

19, 19 designate a continuous row or series of plow disks which are mounted on the frame member 16 in the manner hereinafter described. The frame is strengthened by the internal braces 20 and 21. The frame members are hinged or jointed in the manner hereinafter described to permit the continuous frame to flex vertically, the frame being shown as thus divided into three sections. The member 16 is provided with horizontal arms 22, 23 to the outer ends of which are pivotally mounted to swing horizontally, by well known pivotal connection, stub axles on which are mounted the front and rear furrow wheels 24, 25, respectively. Extending from the land side of the frame are other rigid and braced arms 26, 27 and 28, to the outer ends of which are pivotally mounted the shafts for the land wheels 29, 30 and 31.

In addition to the supporting wheels described I have provided other rolling supporting elements 33, 34 and 35, one for each section, which are arranged to travel on the unplowed ground and to dig into the ground in such way as to afford a hold of the plow in the ground to prevent it shifting laterally. These rollers may be termed draft regulating and supporting rollers. The detail of the rollers 33 and 34 is alike and is shown in Figs. 4 and 5.

Each roller is formed with a plurality of annular spaced flanges forming relatively sharp disks 36, 36 which penetrate the ground and said flanges or disks may be formed on two or more cast sections 37 as found convenient or desirable. As herein shown there are two of such sections in each roller which are keyed to a shaft 38 that is rotatively mounted in bearings in the lower ends of the arms of yokes 39. Said yokes are provided with upright fixed stems 40 which extend upwardly through bearings 41 in arch members 42 which span the frame from side to side and are fixedly attached at their ends to the side members of the frame. Said arch members extend obliquely across the frame or at right angles to the line of draft of the plow. The construction described permits the rollers to rotate or swivel freely relatively to the frame about the axes of their stems 40. The frame is adapted to be raised and lowered relatively to said draft regulating and supporting rollers by means of exteriorly screw-threaded sleeves 43 which are rotatively mounted on the upper ends of said stems 40 and which have screw-threaded engagement with the rings 44 that are connected by the links 45, 45 to bearings 41 of said arch members 42. The said adjusting sleeves 43 are provided with hand wheels 46 by which to rotate them and screw bolts 47 extend downwardly through the hand wheels into the upper ends of the sleeves to prevent the stems raising upwardly through the sleeves. By turning said adjusting screws in one direction the frame is raised relatively to the supporting and draft regulating rollers, and the extent of movement of the adjusting sleeves is such as to raise the frames sufficiently to raise the disks carried thereby away from the ground when the plow is being moved from place to place.

The rear supporting and draft regulating roller 35 is mounted in a bracket 50 which extends rearwardly from the rear member 18 of the frame. Said roller has a swivel connection with the bracket and is provided with a raising and lowering device embracing a hand wheel 51 which is generally similar to the frame raising and lowering devices before described for the rollers 33 and 34.

Each of the sections of the frame is provided with one or more of said draft regulating and supporting rollers and said rollers are made of considerable weight so as to insure them cutting into the ground to afford the proper hold to prevent lateral shifting of the plow. The rollers of the frame sections, with the exception of the last section, may be provided, in addition to the edged disks or flanges, with relatively wide tread supporting wheels 53, 53 which are located on the side of the frame adjacent to the disks to thereby better support the disks. If the weight of the row of disks be such as to tend to tip the plow toward the disk side of the plow, I may provide more than one supporting and draft adjusting roller for each section of the frame, or may extend the said rollers somewhat beyond the land side of the frame.

The land side supporting wheels, as well as the furrow wheels, are also provided with raising and lowering screws which are connected to the swinging stub axles for said wheels and are adapted for screw-threaded engagement with the rings 56 supported from the frame in the same general manner as the rings 44 shown in connection with the supporting and draft regulating rollers. The said screws 55 are provided with pivoted cranks 57, which normally hang in the position shown in Fig. 3, by which the screws are turned to raise and lower the frame relatively to said supporting wheel. It will be understood that all the raising and lowering screws are operated to raise the frame and therewith the disks when the plow is to be moved from place to place, or when at other times a relative adjustment between the supporting elements and disks is desired.

The gang frame, instead of being made rigid from end to end, as has heretofore been the common practice, is made vertically flexible so as to permit the plow to adjust itself to uneven ground. For this purpose the frame members 15 and 16 are provided in their length with a series of joints or hinges, thus dividing the frame into a plurality of sections, all constituting however continuous parts of a unitary frame.

The detail of the hinge or joint 60 of the land side frame member 15 is shown in Fig. 11 wherein it is seen that one end of one member is turned outwardly at 61 to overlap the adjoining end of the adjacent member, and a bar 62 is riveted to the inner side of the out-turned member to provide between the same and out-turned end 61 a space to receive the end of the adjacent member, and said parts are pivotally connected by the horizontal pivot pin 63.

The detail of the joint 65 of the plow side frame member which carries the disks is shown in Fig. 12. As herein shown the sections of the rear frame member 16 are reinforced by heavy bars of iron 66 attached to the inner faces thereof. At the joints or hinges 65 the sections of the frame member 16 are slightly separated, and the bars 66 are lapped one over the other with a hinge pin 68 extending through the overlapping ends of the reinforcing bars and through the vertical web of one of the adjacent angle bar frame members 16.

The manner of attaching the plow disks to the frame member 16 is best shown in Figs. 6, 7 and 8. The mounting for each disk consists of an L-shaped bracket 70 that is pivoted near the end of its shorter arm by the pin 71 to the frame member 16, said pivot pin passing through the vertical web of the frame member and through the reinforcing bar 66. The longer arm of said bracket extends laterally from the frame member and the disk is rotatively mounted thereon in the manner illustrated in my prior application for United States Letters Patent, Serial Number 596,966 filed on the 12th day of December, 1910. This feature of the pivotal mounting of the disk constitutes no part of the present invention and need not be further described. Said disks are adapted to be simultaneously swung into and out of the ground by means which act on the brackets 70 to swing them vertically on their pivots. The actuating means consists, as in the construction shown in my aforesaid prior application, of a reciprocating bar 72, shown as having the form of angle bars, that is slidingly mounted in the frame above the frame member 16 and is connected to the L-shaped bracket 70 by link connections made as follows:—Extending laterally from each of said brackets 70 is a bifurcated lug 75 to which is hinged, as by the bolt 76, the lower end of a slotted bar 77 which is pivotally and slidably connected at its upper end to the reciprocating bar 72. The connection between the upper end of said link 77 and the reciprocating bar consists, in the present instance, of a bracket 79 that is pivotally mounted, as by the bolt 80, on the reciprocating bar and extends laterally therefrom through the slot 81 of said link. Said bracket fits closely in said slot and slides therein endwise of the link. The bracket is apertured to receive a screw-threaded sleeve 82 through which slides the upper end of a rod 83 that is hinged at its lower end to the hinge bolt 76, said rod being separated from the link 77 at the hinge bolt by the spacing block 85. Interposed between the flanged end of the sleeve 82 and a shoulder 86 on said rod is a spiral expansion spring 87 which acts, through the rod and the lug 75, to normally hold the disk and its supporting bracket in its operating position for plowing, as shown in Fig. 6, the spring being made of considerable strength for this purpose.

When the reciprocating bar 72 is moved endwise it acts, through the links 77 and brackets 70, to swing the outer ends of the brackets upwardly and thereby swing the lower sides of the disks away from the ground; and movement of the reciprocating bar in the other direction serves to swing the disks toward the ground. In this movement or operation of the disk the springs 87 perform no function and the upper ends of the links swing about the pivot bolts or pins 80.

The purpose of the springs 87 is to permit the disks to yield out of the ground, relatively to the reciprocating bar 72, when they strike an obstruction, as will be clear from an examination of Fig. 7. The spring 87 is at such time placed under compression and the slotted link is shifted upwardly, relatively to its upper pivot. When the obstruction has been passed the spring will return the disks back to their operating position in the ground.

The reciprocating bar 72 is guided between upper and lower rollers 90, 91 carried by standards 92 which rise from and are rigidly attached to the frame member 16. Said bars are confined in their straight path of movement by means of guide screws 93 (Fig. 1) which extend through guide slots 94 in the reciprocating bar and engage extensions of the standards 92, as best shown in Fig. 1. The said reciprocating bar is made of a number of sections equal to the sections which compose the frame and of the same length as the frame sections, and are jointed at 96 opposite to the joints or hinges of the adjacent plow side frame member 16 so as to flex with said frame members. The said reciprocating bar is reciprocated on the frame by means of a rack and pinion mechanism made as follows:—The bar is provided near its center with a toothed rack 98 which is engaged by a pinion 99 fixed to a vertical shaft on the lower end of which is mounted a worm wheel 100. Said worm wheel is engaged by a worm 101 carried by one end of a horizontal rotative shaft which is mounted in suitable bearings on the frame and is provided at its other end with a beveled gear wheel 103 which meshes with a pinion 104 that is fixed to the rear end of a telescopic, flexible operating shaft 105 which extends forwardly to the engine 107. The said telescopic shaft is provided near its rear and its front ends with universal or gimbal joints 109, 110, respectively, and the forwardmost section 111 of the shaft is mounted in a bearing carried by the upper end of a standard 112 mounted on the rear platform 113 of the engine. The said shaft section 111 is provided with a hand crank 114 by which the shaft may be turned. Rotation of the shaft acts through the worm gear and rack and pinion mechanism described to reciprocate the disk actuating shaft in one direction or the other at will, thus avoiding the necessity of hand actuated levers on the plow frame or other complicated mechanism for operating the disk raising and lowering mechanism. The flexible construction of the operating shaft 105, and its telescopic arrangement permits the angle of the engine and motor to be changed relatively to the plow frame without imposing side stress on the bearings of the operating shaft.

Referring now to the improvements in the draft connections between the engine and plow whereby the draft is equalized and the plow retains its line of draft in case the engine turns out of the direct line of travel, these parts are made as follows: The draw bar 115 of the engine is connected by a link 116 with a transversely arranged equalizing bar 117, said link being pivotally or loosely connected to said draw bar and equalizing bar and connected centrally to the equalizing bar. The said link is connected to the ends of the equalizing bar by a brace chain 118, the chain being trained over a sheave 119 near the front end of the link 116 and being attached to the opposite ends of the equalizing bar in any suitable manner. The chain 118 is normally locked to the bar by the pin 118' adapted to be dropped through the bar 116 and through one of the chain links. This pin may be removed to permit the bar 116 to be swung sidewise relatively to the chain when coupling the engine to the plow. Mounted on said equalizing bar and attached thereto by the clevises 120, 120 are a plurality of sheaves 121, there being one located at each end of the bar and a pair located near the center of the bar. Trained through said sheaves 121 is a draft chain or cable, one end 122 of which is attached to a bar 123 which is pivotally connected to a draft plate 124 attached in any suitable manner to the frame in rear of its longitudinal center; the other end 126 of said chain or cable being attached to a similar bar 127 pivoted to a like draft plate 128 attached to the frame near the front end thereof. The ends 122 and 126 of the chain or cable are trained over the end sheaves 121 and the central looped portion 130 thereof is trained about the central pairs of sheaves 121 of the equalizing bar with the bight of said looped portion of the chain or cable trained about a sheave 137 that is mounted on the forward end of a third draw bar 132 which is pivotally connected to a draft plate 133 that is attached to the frame between the draft plates 124 and 128. The plow is drawn forwardly askew, or with the longitudinal axis of the frame oblique to the line of draft, so that the succeeding rear plows will follow each other parallel to the line of draft slightly at one side of the plow in front thereof. In case the engine should turn slightly from a direct line of travel, as indicated by the dotted lines in Fig. 9, the equalizing bar will be swung obliquely to the line of draft, but the draft chain or cable will shift endwise in the guide sheaves, the longer end 122 paying out to increase its length while the shorter end is taken up or shortened, as indicated in dotted lines in said Fig. 9. There is no tendency therefore upon slight swerving of the engine for the rear end of the plow to be swung out of the line of draft in a manner to increase the angle of the plow frame to the normal line of draft and thereby imperfectly plow the ground, such as would occur if the draft connections were nonequalizing. This feature of the invention may be applied to gang plows of different constructions where there is a tendency upon slight turning of the engine to swing the plow out of the line of draft.

When the plow is to be moved from place to place over a roadway the operating rod 105 will be disconnected from the engine and may be swung downwardly over the plow frame, and the draft link 116 is disconnected from the draw bar of the engine and the draft connections thrown backwardly over the plow. The engine will then be hitched directly to the end of the plow frame, as to the forwardmost draft bar 127, so as to draw the frame forwardly in the line of its longitudinal axis. It will of course be understood that preparatory to moving the plow from place to place the frame and plows carried thereby will be raised by the raising and lowering screws 43 and 55 before described.

In order that the supporting wheels and rollers may trail and be held in paths parallel to the line of travel of the plows when on the road, and may trail and be held in paths parallel to the line of draft when the plow is in operation, I have connected the several rolling supporting elements in a manner which will now be described.

The axles for the forward furrow and land wheels 24 and 31 are connected by the link 135 which is pivotally connected with fixed arms on the swinging stub axles for said wheels. The swinging axles of the land wheels 29 and 30 are connected through links 136 and the draw bars 123, 132 to the adjacent supporting and draft regulating rollers 34 and 33, respectively, the end sections of the links being pivoted to arms rigid with said rollers and swinging axles. The roller 34 is connected by a link 137 to the axle of the rearmost roller 35, which roller is in turn connected by a link 138 to the swinging axle of the rear furrow wheel 25. The connecting links 135, 136, 136 extend transversely to the draft bars 127, 132 and 123, respectively, and suitable interlocking connections are arranged between the frame and draft bars so as to positively throw the axles of the wheels and rollers at right angles to the line of draft when the engine is hitched to the plow for work in the field.

The connection between the forwardmost draft bar 127 and the link 135 consists of a pin 139 that is dropped through openings in said bar and link, as shown in Fig. 1. The links 136, 136 may be made of inner and outer sections, as shown in Fig. 1, with the outer ends of the inner sections loosely connected to lugs 140, 140 on the draft bars 132 and 123 and the inner ends of the outer sections connected by the pins 141, 141 to said latter draft bars. When the plow is to be adjusted for traveling on the road the pin 139 is removed from the draft bar 127 and link 135 and the draft bar is permitted to swing freely. The other draft bars 132 and 123 are swung over brackets 144 fixed to the frame so as to be parallel with the longitudinal axis of the frame and said bars and brackets are apertured as shown in Fig. 1 to receive pins by which the parts are locked together. When said bars are thus swung to the center of the plow frame all the rollers 33, 34 and 35, and the wheels 30, 29 and 25 are swung into positions parallel with the longitudinal axis of the plow frame. When the engine is hitched to the forwardmost draft bar 127 said bar is swung into line with the plow frame and said bar and the forward wheels 24 and 31 automatically find their positions in line with the longitudinal axis of the plow frame.

The equalizing draft connection above described is not herein claimed but is made the subject of an application for U. S. Letters Patent, filed on the 19th day of May, 1911, Serial No. 628,336, which is a division of this application.

It will be observed that the spaced disk edges 36 of the rollers 33, 34 and 35 are beveled on one side and are straight on the other side. The beveled sides of said disk edges are on that side of the disk which face the plow disks, or on the side thereof opposite that toward which the plow tends to be shifted by the lateral thrust of the disks. This arrangement insures that the disk edges will be forced into the ground in reliable holding engagement therewith. The roller described may be used with other forms of gang plows when necessary to guide the plow and hold it in its line of draft.

It will be obvious that the constructions described are capable of considerable variation within the spirit and scope of my invention and that certain of the features of construction herein claimed are capable of associated or independent use with respect to the particular form of plow frame shown.

I do not wish to be limited to the specific details of construction and combination of the elements illustrated except as hereinafter made the subject of specific claims.

I claim as my invention:—

1. A wheeled gang plow comprising an elongated, continuous, unitary frame arranged to be drawn forward at an oblique angle to the line of draft, a single row of plows pivotally mounted on said frame and arranged to be raised out of and lowered into the ground, said frame being provided with spaced joints or hinges to permit vertical flexure of the plow to adapt itself to uneven ground, and raising and lowering means for the plows embracing a reciprocating member consisting of hinged sections, guiding means on the frame for guiding the member in reciprocating movement, and means for reciprocating said member.

2. A wheeled gang plow comprising an elongated, continuous frame consisting of side and end members arranged as a parallelogram, the side members being provided with joints or hinges with the hinges of one member arranged diagonally opposite to those of the other member, a single row of plows pivotally connected with one member of the frame by means permitting the plows to be raised from and lowered into the ground, a reciprocable bar mounted in the frame and connected with said plows and provided opposite to the joints or hinges of one of the frame members with hinges to permit the bar to flex with said frame members, and means for reciprocating said bar.

3. A wheeled gang plow comprising a frame consisting of side and end members arranged as a parallelogram, the side members being provided with joints or hinges with the hinges of one member arranged diagonally opposite to the hinges of the other member, thereby dividing the frame into a plurality of flexible sections, land and furrow supporting wheels, and supporting and draft regulating rollers for said frame and a single row or series of plows supported by one of said frame members.

4. A wheeled gang plow comprising a frame consisting of side and end members arranged as a parallelogram, the side members being provided with joints or hinges with the hinges of one member arranged diagonally opposite to the hinges of the other member, thereby dividing the frame into a plurality of flexible sections, land and furrow supporting wheels and supporting and draft regulating rollers for said frame and a single row or series of plows supported by one of said frame members, said rollers being formed with spaced edged disk members arranged to cut into the unplowed ground.

5. A wheeled gang plow comprising a frame consisting of side and end members arranged as a parallelogram, the side members being provided with joints or hinges with the hinges of one member arranged diagonally opposite to the hinges of the other member, thereby dividing the frame into a plurality of flexible sections, land and furrow supporting wheels and supporting and draft regulating rollers for said frame and a single row or series of plows supported by one of said frame members, said rollers being formed with spaced edged disk members arranged to cut into the unplowed ground, the edged disk members being beveled on the sides thereof adjacent to the rows of the plows, and being straight on their other sides.

6. A wheeled gang plow comprising a frame consisting of side and end members arranged as a parallelogram, the side members being provided with joints or hinges with the hinges of one member arranged diagonally opposite to the hinges of the other member, thereby dividing the frame into a plurality of flexible sections, land and furrow supporting wheels, and supporting and draft regulating rollers for said frame and a single row or series of plows supported by one of said frame members, said rollers embracing spaced edged disk members arranged to cut in the unplowed ground, and wide tread supporting wheels arranged adjacent to the plow side of the frame.

7. A wheeled gang plow comprising an elongated, continuous frame consisting of side and end members arranged as a parallelogram, with supporting wheels and supporting and draft regulating rollers, the side members being provided with joints or hinges with the hinges of one member arranged diagonally opposite to those of the other member, a single row of plows pivotally connected with one member of the frame by means permitting the plows to be raised from and lowered into the ground, a reciprocable bar mounted in the frame and connected with said plows and provided opposite to the joints or hinges of one of the frame members with hinges to permit the bar to flex with said frame members, means for reciprocating said bar, and screw-threaded means associated with said supporting wheels and supporting and draft regulating rollers for raising the frame and plows relatively to the wheels and rollers.

8. A wheeled gang plow comprising a frame, plows carried thereby, land furrow wheels for supporting the plow and a supporting and draft regulating roller arranged to travel on the unplowed ground and provided with a series of spaced circumferential edges.

9. In a wheeled gang plow, a supporting and draft regulating roller extending transversely of the plow frame and comprising a plurality of longitudinally spaced, edged disk members, an upright bearing member connected with the roller and having rotative bearing in the frame permitting the angle of the roller to the frame to be varied, and means for locking said roller in fixed relation to the frame.

10. In a wheeled gang plow, a supporting and draft regulating roller extending transversely of the plow frame and comprising a plurality of longitudinally spaced, edged cutting members and means for connecting the roller to the plow frame, said cutting edges being all beveled on one side and straight on the other side, for the purpose set forth.

11. In a wheeled gang plow, a supporting and draft regulating roller extending transversely of the plow frame and comprising a plurality of longitudinally spaced, edged disk members, means for connecting the roller to the plow frame, said roller being provided with an upright bearing stem, a bearing sleeve in the frame in which said stem has rotative bearing, and a screw-threaded adjusting sleeve having screw-threaded engagement with a part connected with the plow frame and bearing on said stem for the purpose of raising and lowering the frame relatively to the said roller.

12. In a wheeled gang plow, a frame, a plurality of plow supporting brackets pivoted to said frame, plows mounted on said brackets, means acting on said brackets for simultaneously swinging all of said plows away from or toward the ground comprising a reciprocating bar mounted on the frame, and connections between the plow brackets and reciprocating bar comprising links pivotally connected to the plow brackets and having sliding and pivotal connection with the reciprocating bar, and springs associated with said bars and acting on said brackets to normally hold the plows in the ground and arranged to yield to permit the plows to swing out of the ground upon striking an obstruction.

13. In a wheeled gang plow, a frame, a plurality of plow supporting brackets pivoted to said frame, plows mounted on said brackets, means acting on said brackets for simultaneously swinging all of said plows away from or toward the ground comprising a reciprocating bar mounted on the frame, and connections between the plow brackets and the reciprocating bar comprising slotted links pivoted to the plow brackets, brackets connected with the reciprocating bar and extending into the slots of the link, rods pivoted to said plow brackets and having sliding engagement with the first named brackets and springs interposed between said first named brackets and shoulders on said rods.

14. In a gang plow, the combination with a frame, a bracket pivoted thereto and a plow mounted on said bracket, of means for swinging the bracket on its pivot to raise and lower the plow, embracing a link pivotally connected with the bracket, an operating device therefor, said link having sliding and pivotal connection with the operating device and a spring interposed between the latter pivotal connection and said bracket for holding the plow in the ground and arranged to yield to permit the plow to swing out of the ground.

15. The combination with a gang plow frame having a plurality of gang plows and an engine for pulling the plow, of means for raising and lowering the plows from the ground, embracing a reciprocating bar on the plow frame operatively connected to the plows, a pinion meshing with the bar, a worm gear mechanism for rotating the pinion, an operating shaft geared to said worm gear mechanism and extending forwardly to the engine, a bearing for the operating shaft on the engine and a crank device connected with said shaft at the engine.

16. The combination with a gang plow frame having a plurality of gang plows and an engine for pulling the plow, of means for raising and lowering the plows from the ground, embracing a reciprocating bar on the plow frame operatively connected to the plows, a pinion meshing with the bar, a worm gear mechanism for rotating the pinion, a flexible and telescopic operating shaft geared to the worm gear mechanism and extending forwardly to the engine, a bearing on the engine in which the forward end of the shaft is rotatively mounted and a crank device attached to said shaft at the engine.

In testimony, that I claim the foregoing as my invention I affix my signature in the presence of two witnesses, this 4th day of February A. D. 1911.

NICHOLAS WEILER.

Witnesses:
WILLIAM L. HALL,
WILLIAM GOLDBERGER.